(12) United States Patent
Barsness et al.

(10) Patent No.: US 8,095,512 B2
(45) Date of Patent: Jan. 10, 2012

(54) MANAGING DATABASE RESOURCES USED FOR OPTIMIZING QUERY EXECUTION ON A PARALLEL COMPUTER SYSTEM

(75) Inventors: Eric Lawrence Barsness, Pine Island, MN (US); David L. Darrington, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 11/942,337

(22) Filed: Nov. 19, 2007

(65) Prior Publication Data
US 2009/0132541 A1 May 21, 2009

(51) Int. Cl.
*G06F 17/00* (2006.01)
*G06F 7/00* (2006.01)
(52) U.S. Cl. ......... 707/652; 707/637; 707/812; 707/966
(58) Field of Classification Search ........................ None
See application file for complete search history.

(56) References Cited

U.S. PATENT DOCUMENTS

| | | | |
|---|---|---|---|
| 4,769,772 A | | 9/1988 | Dwyer |
| 5,301,317 A | * | 4/1994 | Lohman et al. ......................... 1/1 |
| 5,325,525 A | * | 6/1994 | Shan et al. ..................... 718/104 |
| 5,335,345 A | * | 8/1994 | Frieder et al. ......................... 1/1 |
| 5,349,682 A | | 9/1994 | Rosenberry |
| 5,574,900 A | * | 11/1996 | Huang et al. ......................... 1/1 |
| 5,590,319 A | * | 12/1996 | Cohen et al. ......................... 1/1 |
| 5,692,174 A | * | 11/1997 | Bireley et al. ......................... 1/1 |
| 5,692,192 A | | 11/1997 | Sudo |
| 5,857,180 A | * | 1/1999 | Hallmark et al. ..................... 1/1 |
| 6,625,593 B1 | * | 9/2003 | Leung et al. ......................... 1/1 |
| 6,850,927 B1 | * | 2/2005 | Hsu ..................................... 1/1 |
| 2002/0010706 A1 | * | 1/2002 | Brickell et al. ................ 707/200 |
| 2002/0114341 A1 | * | 8/2002 | Sutherland et al. ........... 370/428 |
| 2003/0158887 A1 | | 8/2003 | Megiddo |
| 2004/0158663 A1 | * | 8/2004 | Peleg ............................ 710/100 |
| 2006/0112090 A1 | * | 5/2006 | Amer-Yahia et al. ............. 707/4 |
| 2007/0239851 A1 | | 10/2007 | Bryant et al. |
| 2008/0065583 A1 | * | 3/2008 | Coverston et al. ................ 707/1 |
| 2009/0132609 A1 | | 5/2009 | Barsness et al. |

OTHER PUBLICATIONS

U.S. Patent Application entitled, "Real Time Data Replication for Query Execution in a Massively Parallel Computer," filed Nov. 16, 2007, U.S. Appl. No. 11/941,141.
D (Continued)

*Primary Examiner* — Greta Robinson
*Assistant Examiner* — James J Wilcox
(74) *Attorney, Agent, or Firm* — Patterson & Sheridan LLP

(57) ABSTRACT

Embodiments of the invention may be used to increase query processing parallelism of an in-memory database stored on a parallel computing system. A group of compute nodes each store a portion of data as part of the in-memory database. Further, a pool of compute nodes may be reserved to create copies of data from the compute nodes of the in-memory database as part of query processing. When a query is received for execution, the query may be evaluated to determine whether portions of in-memory should be duplicated to allow multiple elements of the query (e.g., multiple query predicates) to be evaluated in parallel.

21 Claims, 6 Drawing Sheets

OTHER PUBLICATIONS arling, et al., "The Design, Implementation and Evaluation of Mpiblast," In Proceedings of ClusterWorld and Expo, (2003), 14 pages.

Cieslewicz, et al., Realizing Parallelism in Database Operations: Insights from a Massively Multi-threaded Architecture, Proceedings of the Second International Workshop on Data Management on New Hardware, AC (2006), 7 pages.

Taylor, et al., "Using Distributed Query Result Caching to Evaluate Queries for Parallel Data Mining Algorithms," PTPTA (1998), 6 pages.

Ranwala, et al., "Massively Parallel Blast for the Blue Gene L," In High Availability and Performance Computing Workshop, (2005), 6 pages.

Office Action for U.S. Appl. No. 11/941,141, dated Feb. 4, 2010.

* cited by examiner even pages 1
MANAGING DATABASE RESOURCES USED FOR OPTIMIZING QUERY EXECUTION ON A PARALLEL COMPUTER SYSTEM

BACKGROUND OF THE INVENTION

1. Field of the Invention

Embodiments of the present invention generally relate to query execution and more particularly to real time data replication for query execution in a parallel computing system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and IBM has announced that a Blue Gene/L system had reached an operational speed of 280.6 teraflops (280.6 trillion floating-point operations per second), making it the fastest computer in the world at that time. Further, at one point, Blue Gene/L installations at various sites world-wide were among five out of the ten top most powerful computers in the world.

A database provides a well known software application used to store and query information. Because of the large parallel architecture provided by a Blue Gene system (and other parallel system architectures), database query operations may be performed in parallel. For example, a large in-memory database may be created by distributing database data across the compute nodes of a parallel system. In such a case, when queries are submitted for execution, multiple compute nodes may simultaneously perform aspects of query processing.

SUMMARY OF THE INVENTION

One embodiment of the invention includes a method for managing database resources on a parallel computer system. The method may generally include providing a database distributed across a first group of compute nodes, where each compute node in the first group stores a respective portion of the database. The method may further include assigning a second group of compute nodes to a pool, where each compute node in the pool is available to replicate the respective portion of the database stored on one of the compute nodes in the first group of compute nodes. In response to receiving a query to execute against the database, one or more compute nodes from the pool are allocated to dynamically replicate the portion of the database stored on a corresponding one or more compute nodes of the first group of compute nodes. The method may further include executing, in parallel, the query on at least the one or more compute nodes allocated from the pool and on the corresponding one or more compute nodes of the first group of compute nodes.

Another embodiment of the invention includes a computer-readable storage medium containing a program which, when executed, performs an operation for managing database resources on a parallel computer system. The parallel computing system may include a database distributed across a first group of compute nodes, where each compute node in the first group stores a respective portion of the database. The operation may generally include assigning a second group of compute nodes to a pool, where each compute node in the pool is available to replicate the respective portion of the database stored on one of the compute nodes in the first group of compute nodes. In response to receiving a query to execute against the database, one or more compute nodes from the pool may be allocated to dynamically replicate the portion of the database stored on a corresponding one or more compute nodes of the first group of compute nodes. The operation may further include executing, in parallel, the query on at least the one or more compute nodes allocated from the pool and on the corresponding one or more compute nodes of the first group of compute nodes.

Still another embodiment of the invention includes a parallel computing system. The system may generally include a plurality of compute nodes, each having at least a processor and a memory. The plurality of compute nodes may include a first group of compute nodes, each storing a respective portion of an in-memory database, and a second group of compute nodes allocated to a pool. The compute nodes in the pool may be available to replicate the respective portion of the database stored on one of the compute nodes in the first group of compute nodes. The system may further include a master compute node comprising a database management program configured, in response to receiving a query to execute against the in-memory database, to allocate one or more compute nodes from the pool to dynamically replicate the portion of the database stored on a corresponding one or more compute nodes of the first group of compute nodes. The database management program may be further configured to execute, in parallel, the query on at least the one or more compute nodes allocated from the pool and on the corresponding one or more compute nodes of the first group of compute nodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
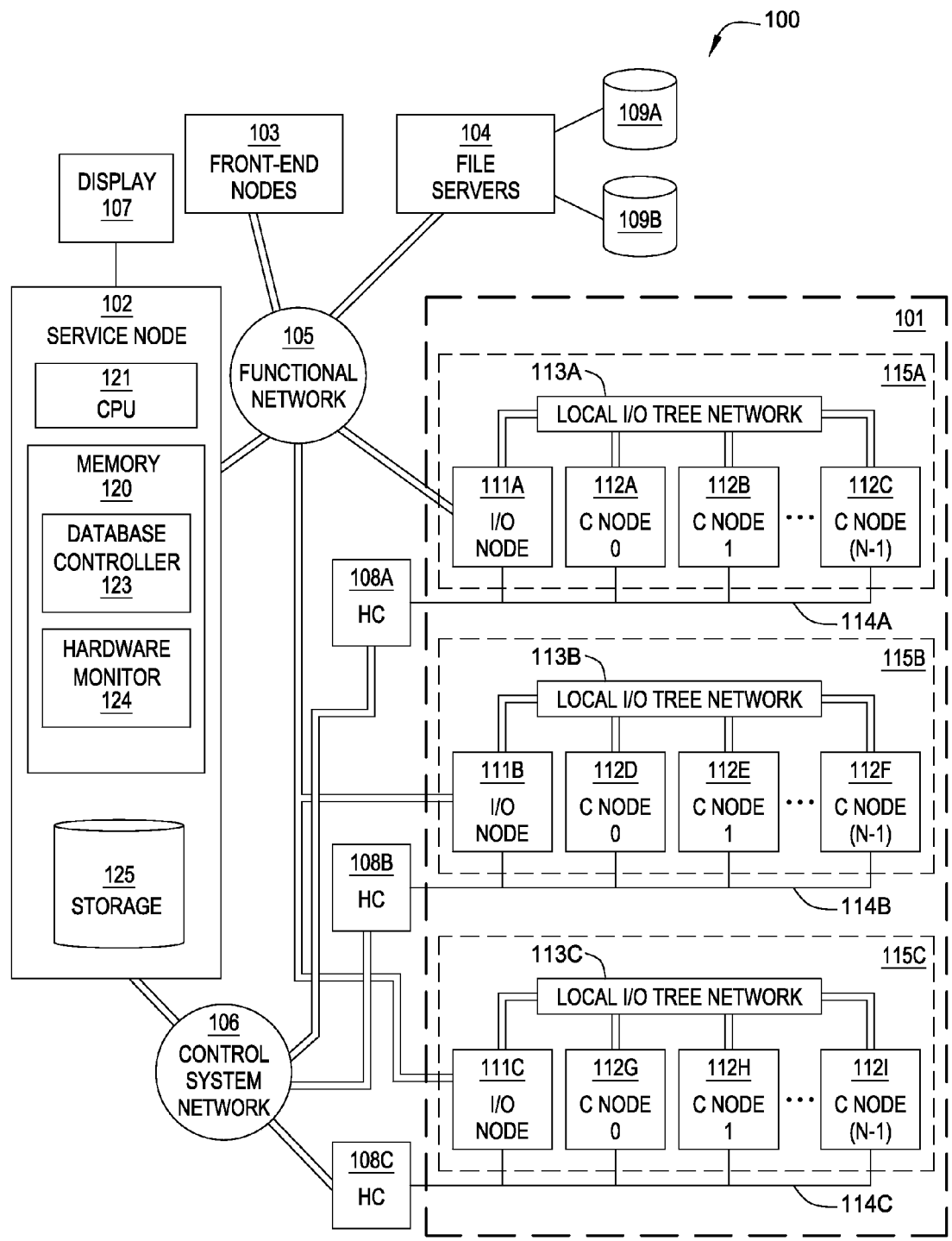
FIG. 1 is a high-level block diagram of components of a massively parallel computer system, according to one embodiment of the present invention.

Embodiments of the invention provide a mechanism for real time data replication for query execution. In particular, embodiments of the invention may be used to evaluate a multi-predicate query using a set of data copied from one compute node to another. Duplicating a set of data in several nodes and separating query predicates may improve the efficiency of query execution by exploiting parallelism in a parallel computing system. For example, each predicate of a query may be processed simultaneously by several nodes using copies of data, which may be more expedient than sequentially evaluating query predicates using a single copy of data. In one embodiment, the compute nodes of a parallel system store an in-memory database, where each compute node stores a portion of database. Further, data from one compute node may be dynamically copied to another node as part of processing a database query, e.g., when a query includes multiple predicates evaluated using data stored on the same compute node. Additionally, a database controller application may be configured to manage query execution and use a pool of compute nodes available for duplication during query processing. The controller application may provide a software application running on one of the compute nodes of the parallel computer system, or on an associated service node.

Furthermore, the pool may be configurable in its usage. Meaning that for a given query the amount of parallelism (i.e., the amount of node replication) may be configurable. For example, the system may specify a minimum threshold of expected improved performance before data is copied from one compute node to another. In other words, unless query performance may be improved by a sufficient amount, parallelism (i.e., copying data from one node to another) may be disabled. Limits on parallelism may also be used to prevent network flooding.

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Additionally, as shown, each of I/O nodes 111A-C includes an MPI rank mapping table 116A-C. In one embodiment, MPI rank mapping tables 116A-C store mappings between an <x, y, z> network coordinate of a given compute node 112 and an MPI rank value assigned to a process running on that compute node 112. Thus, when one of compute nodes 112 needs to transmit a message to a process with a given MPI rank, that compute node may request the appropriate <x, y, z> coordinates from I/O node 111. Further, each compute node 112 may maintain a local cache of mappings between MPI ranks and <x, y, z> network coordinates.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate process running on one of compute nodes 112 to another one of compute nodes 112, and perform diagnostic and maintenance functions.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, performance data may be gathered and transmitted to service node 102 without affecting the performance of that application.

Illustratively, memory 120 of service node 102 includes a database controller 123 and a hardware monitor 124. In one embodiment, database controller 123 may be configured to evaluate a given database query, and under certain circumstances, copy data from one compute node 112 (storing a portion of an in-memory database) to another, thereby allowing compute nodes 112 to act on data in parallel. Database controller 123 may be configured to select which compute nodes 112 to copy in order to maximize usage of a pool of compute nodes 112. For example, data from a compute node 112 storing a frequently accessed portion of an in-memory database may be more likely to be copied into a node from the pool than less frequently accessed portions of the database.

As another example, if a given query includes multiple predicates evaluated against the same set of data (i.e., against data in the same compute node 112 of an in-memory database), then the database controller 123 may create a copy of that compute node 112 for each predicate. Doing so allows multiple predicates to be evaluated in parallel. Additionally, query results for each predicate may be represented as a bit string, where a "1" indicates that a given record satisfies a predicate and a "0" indicates that a given record does not. The bit strings from multiple predicates may be logically "ORed" "or "ANDed" based on how the predicates were connected in the query to determine a final set of database records to include in query results. Even though some additional processing overhead may be incurred to create copies of the data in multiple compute nodes 112, it is generally more than overcome by the parallel evaluation of the query predicates. Hardware monitor 124 may be configured to monitor various aspects of hardware state (e.g., network connectivity) among compute nodes 112.

Although shown in FIG. 1 as part of service node 102, in an alternative embodiment, the database controller 123 may execute on one (or more) of compute nodes 112 assigned the role of a master node of an in-memory database. In such a case, the master node may be configured to receive queries for submitted for execution, perform the coordination and control functions for a pool of compute nodes as described above.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2:
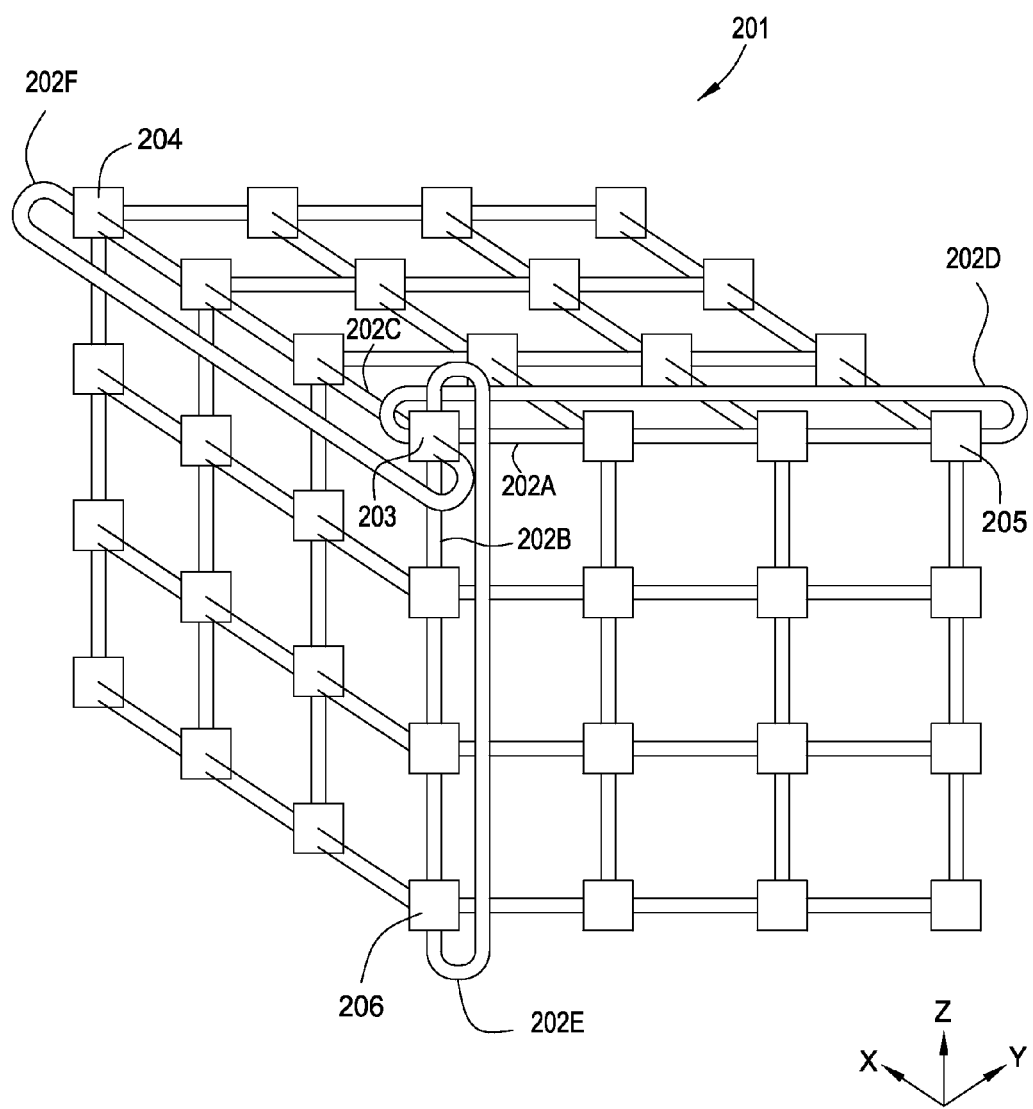
FIG. 2 is a conceptual illustration of a three dimensional torus network of the system of FIG. 1, according to one embodiment of the invention.

As stated, in a massively parallel computer system 100, compute nodes 112 may be logically arranged in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
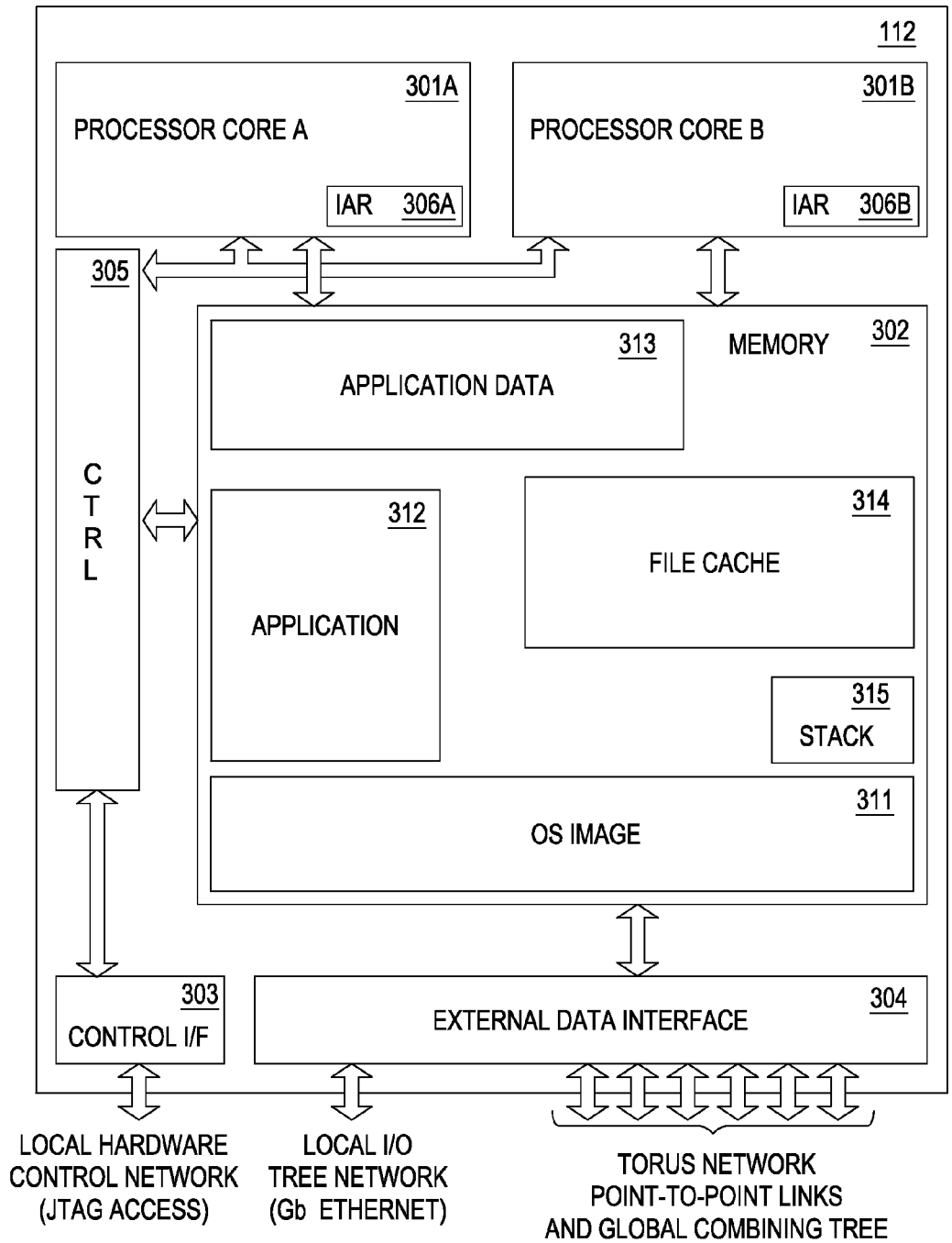
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 (e.g., functional network 105) and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313, as required. Additionally, memory 302 may also include a file cache 314, i.e., a cache of data read from or to be written to an I/O file. Operating system image 311 provides a copy of a simplified-function operating system running on compute node 112. Operating system image 311 may include a minimal set of functions required to support operation of the compute node 112.

Application code image 312 represents a copy of the parallel program being executed by compute nodes 112. Application code image 302 may include a copy of a computer program being executed by multiple compute nodes 112, but where the program is very large and complex, it may be subdivided into portions where different programs run on different compute nodes 112 to cooperate and, collectively, accomplish a parallel computing task. Memory 302 may also include a call-return stack 315 for storing the states of procedures which must be returned to, which is shown separate from application code image 302, although it may be considered part of application code state data. In context of the present invention application 312 may be a database application configured to perform database operations related to a portion of an in-memory database stored on compute node 112 as application data 313 (e.g., evaluating database queries, reading and storing data in a structured form, etc). Alternatively, where node 112 is part of a pool of compute nodes, application data 313 may store a portion of an in-memory database copied from another node.

Figure 4:
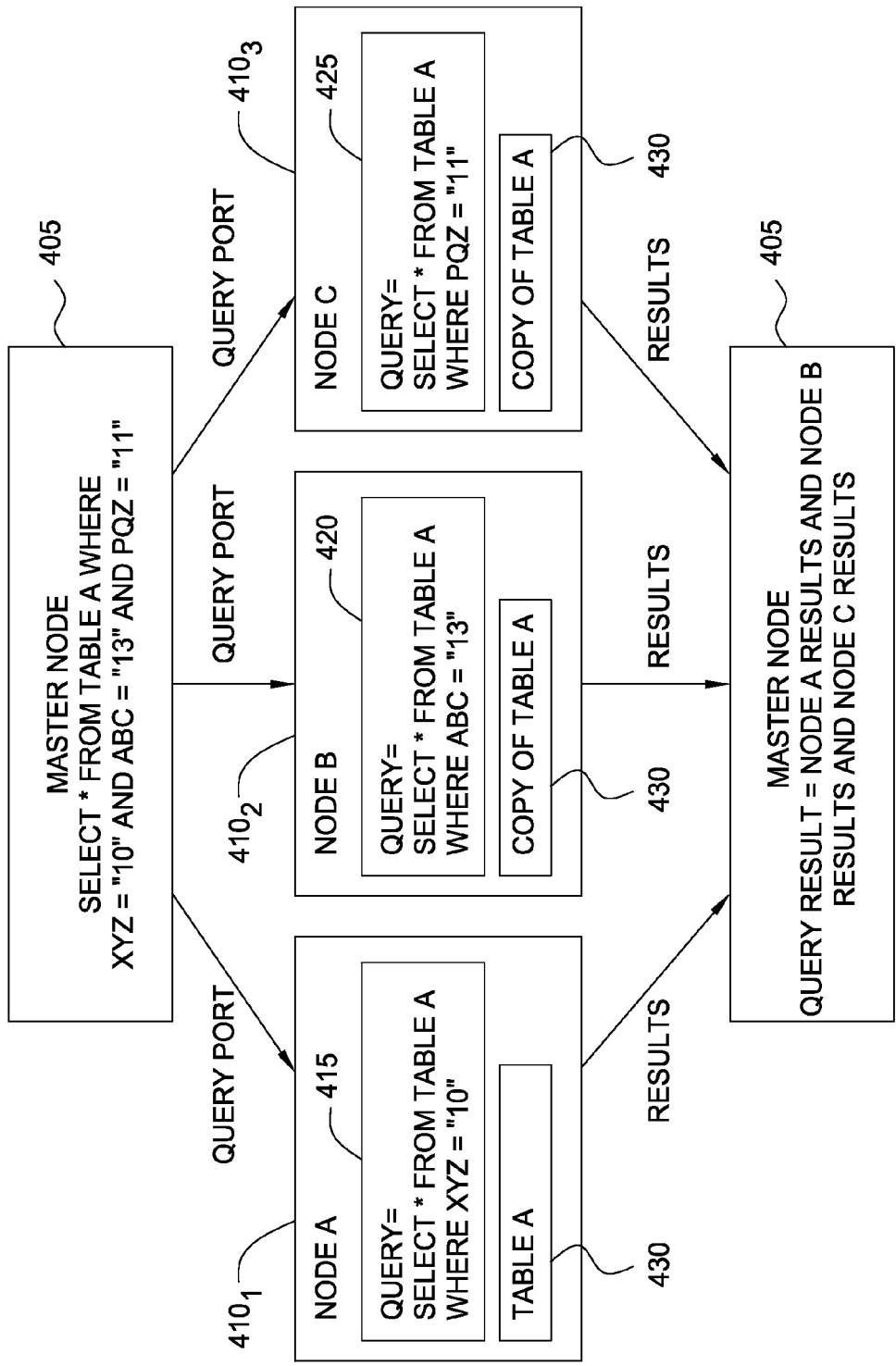
FIG. 4 is a diagram illustrating an example of query processing that includes replicating data from one compute node in an in-memory database to another node, according to one embodiment of the invention.

FIG. 4 is a diagram illustrating an example of query processing that includes replicating data from one compute node in an in-memory database to another node, according to one embodiment of the invention. As shown, a master node 405 (e.g., one of compute nodes 112) receives a database query to be executed against an in-memory database. Illustratively, the query is composed in the well-known SQL query language and provides as follows:

"Select * from Table A where (XYZ="10") and (ABC="13") and (PQZ="11")"

This query specifies to retrieve data records from an example "Table A" 430 that satisfy three different query predicates. In this case, assume that "Table A" 430 is stored on a compute node $410_1$ (Node A) as part of an in-memory database. Because the query includes three predicates that are evaluated against the same set of data (i.e., "Table A" 430), master node 405 (or database controller 123) may select to create additional copies of "Table A" 430 on compute nodes 112 available from a pool of compute nodes. Computes nodes $410_2$ and $410_3$ (node B and node C, respectively) each store a copy of "Table A" 430. After replication, three copies of "table A" 430 are available for processing the query received by master node 405.

Once "Table A" 430 is replicated on compute nodes $410_2$ and $410_3$, the master node 405 may send one of the three query predicates to the original "Table A" 430 (on compute node $410_1$) and one of the three query predicates to each of the copies of "table A" 430 on compute nodes $410_2$ and $410_3$. As shown, compute node $410_1$ executes query 415, which includes the query predicate of (XYZ="10"), compute node $410_2$ executes query 420, which includes the query predicate of (ABC="13"), and compute node $410_3$ executes query 425, which includes the query predicate of "(PQZ="11"). By evaluating each query predicate on a different compute node 410, parallelism is substantially increased. After each of compute nodes $410_{1-3}$ completes evaluating its respective query 415, 420, and 425, the results may be returned to master node 405. The master node 405 may then reconcile the query results received from compute nodes $410_{1-3}$ to determine a final set of database records which satisfy all three query predicates.

Figure 5:
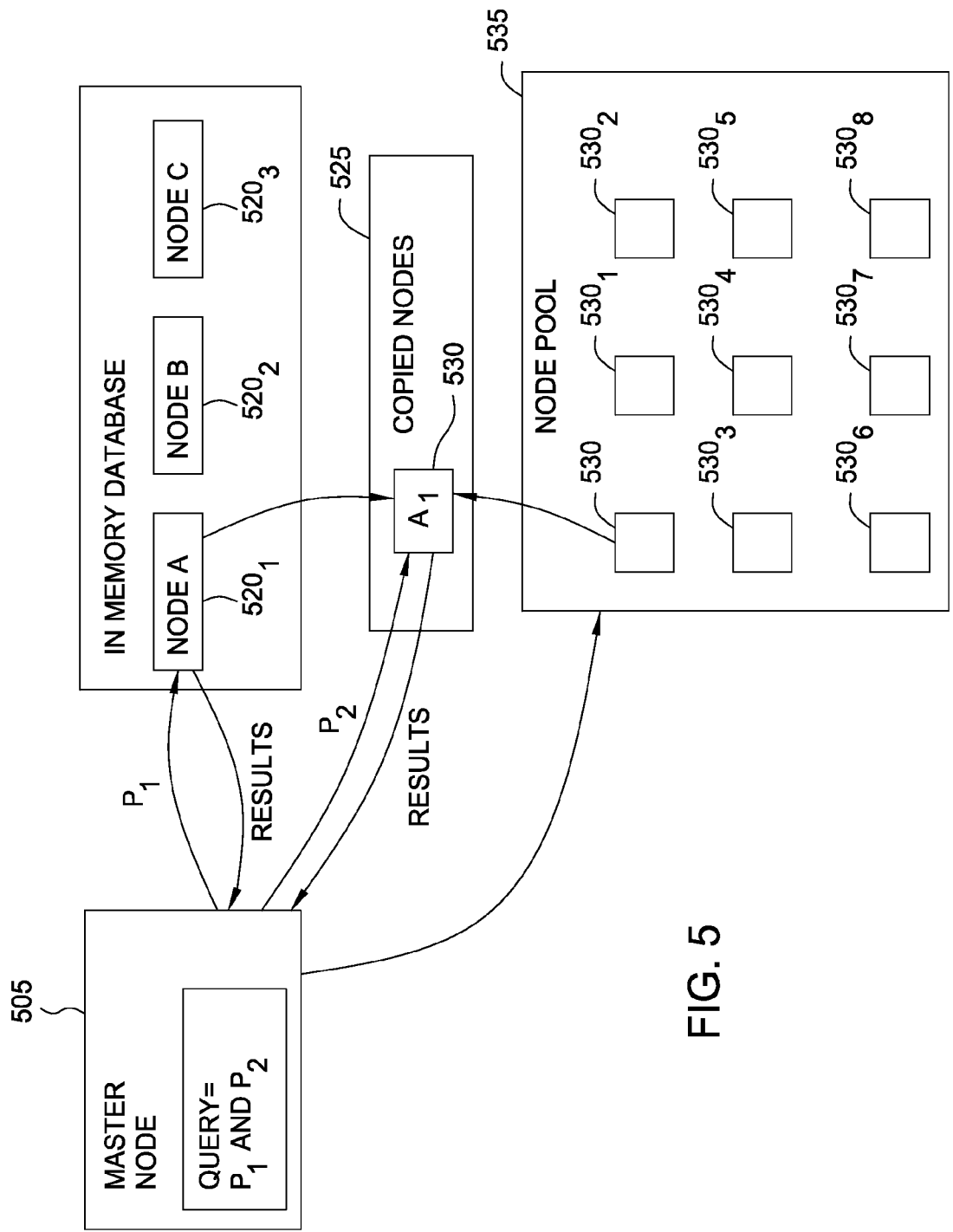
FIG. 5 is a conceptual illustration of a master node managing a pool of compute nodes, according to one embodiment of the invention.

FIG. 5 is a conceptual illustration of a master node 505 managing a pool of compute nodes storing an in-memory database 515, according to one embodiment of the invention. In this example, master node 505 receives a multi-predicate query 510 which includes two predicates labeled "P1" and "P2." As shown, in-memory database 515 is stored across three compute nodes $520_{1-3}$, labeled "Node A," "Node B," and "Node C," respectively. Further, data used to evaluate multi-predicate query 510 may be found in an in-memory database 515. Specifically, in this example, the data used to evaluate predicates "P1" and "P2" is stored in "Node A" 520 of in-memory database 515.

To process query 510, master node 505 may instruct "Node A" 520 to copy itself to another compute node. Master node 505 may allocate a node 530 from a pool of nodes to store the copy of "Node A" 520. Node pool 535 includes nodes made available to provide parallelism in database operations. In one embodiment, as queries are received, nodes from the node pool 535 may be used to replicate portions of the database in order to process elements of that particular query. Alternatively (or additionally) some nodes of the in-memory database may be duplicated by compute nodes from node pool 535 in advance of receiving any queries. The node pool 535 may be configured to allow for a minimum and maximum number of nodes, as well as a minimum and maximum number of compute nodes used for a given query. These limits could further be defined per application, per user, or defined based on job submission category such as user priority, and the like.

A copied node set 525 represents nodes allocated from pool 535 to store data from one of the nodes 520 of in-memory database 515. In the example shown in FIG. 5, data from "Node A" 520 is copied into the node 530 allocated from node pool 535. While one of nodes 530 store a copy of data from in-memory database 515, the node may be part of a copied node set 525. Further, after a given query is evaluated, a node in copied node set 525 need not immediately be returned to node pool 535. For example, master node 510 may evaluate historical query execution patterns to identify which nodes 520 of in-memory database 515 should have one or more duplicate copies in copied node set 525, or may simply track which nodes (e.g., nodes $520_{1-3}$) are copied more often than others and maintain copies of such nodes in copied node set 525.

To process the query 510, master Node 505 sends the "P1" predicate to "Node A" 520 and sends the "P2" predicate to node 530. A database application running on each of Node $520_1$ and copied node 530 may then evaluate the query predicates "P1" and "P2" and return the results to master node 505.

Figure 6:
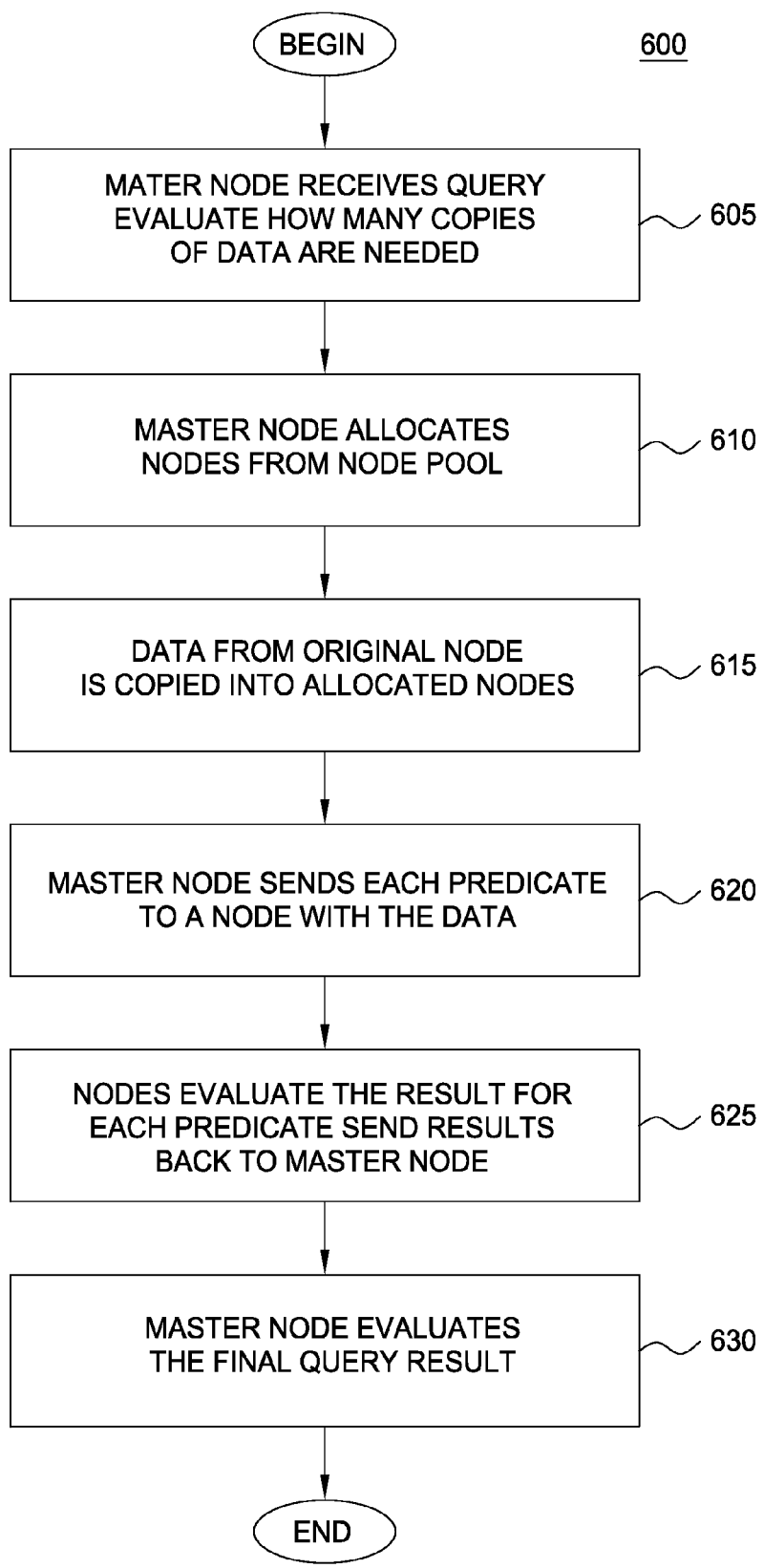
FIG. 6 is a flow diagram illustrating a method for data replication for query execution, according to one embodiment of the invention.

FIG. 6 is a flow diagram illustrating a method 600 to replicate data for query execution, according to one embodiment of the invention. As shown, the method 600 begins at step 605, where a master node receives a query. In response, the master node may evaluate the query and determine whether to allocate one or more nodes from a node pool as part of processing the query. For example, the master node may compare an estimate of time needed to run the query using the in-memory database with an estimate of time needed to run the query in parallel by dynamically creating copies of portions of the in-memory database.

If parallelism may be used to reduce the time required to evaluate the query, then the master node may allocate one or more compute nodes from a pool. (step 610). In one embodiment, the number of nodes allocated may equal the number of predicates included the query that are to be evaluated using the same portion of the in-memory database (e.g. query predicates evaluating records from the same database table). However, depending on the composition of the query received at step 605, as well as the distribution of the in-memory database across a collection of compute nodes, it may be more efficient to run several predicates on the same node with a single copy of data. Of course, in some cases, the query predicate may evaluate data stored in multiple compute nodes of the in-memory database. Accordingly, the number of nodes from the node pool used to make copies may vary.

At step 615, data from one or more compute nodes of the in-memory database may be copied to nodes allocated from the pool. At step 620, the master node may transmit a portion of the query to the compute nodes storing portions of the in-memory database, as well as transmit portions of the query to compute nodes allocated from the pool copying portions of data from nodes of the in memory database. At step 625, each node that receives a portion of the query may evaluate that portion. Once evaluated, each node may send the query results back to the master node. As described above, in one embodiment, query results may be represented as a bit string, where a "1" indicates that a given record satisfies a predicate and a "0" indicates that a given record does not. At step 630 the master node evaluates the final query result. For example, the bit strings from multiple predicates may be logically "ORed" "or "ANDed" based on how the predicates were connected in the query received at step 605 to determine a final set of database records to include in query results.

Advantageously, embodiments of the invention may be used to increase query processing parallelism of an in-memory database stored on a parallel computing system. A group of compute nodes each store a portion of data as part of the in-memory database. Further, a pool of compute nodes may be reserved to create copies of data from the compute nodes of the in-memory database as part of query processing. When a query is received for execution, the query may be evaluated to determine whether portions of in-memory should be duplicated to allow multiple elements of the query (e.g., multiple query predicates) to be evaluated in parallel.

While the foregoing is directed to embodiments of the present invention, other and further embodiments of the invention may be devised without departing from the basic scope thereof, and the scope thereof is determined by the claims that follow.

What is claimed is:

1. A method for managing database resources on a parallel computer system, the method comprising:
providing a database distributed across a first group of compute nodes, wherein each compute node in the first group stores a respective portion of the database;
assigning a second group of compute nodes to a pool, wherein each compute node in the pool is available to replicate the respective portion of the database stored on one of the compute nodes in the first group of compute nodes;
prior to allocating one or more compute nodes from the pool, determining that a predicted decrease in query execution time from replicating respective portions of the database exceeds a specified minimum;
in response to receiving a query to execute against the database, allocating one or more compute nodes from the pool to dynamically replicate the portion of the database stored on a corresponding one or more compute nodes of the first group of compute nodes; and
executing, in parallel, the query on at least the one or more compute nodes allocated from the pool and on the corresponding one or more compute nodes of the first group of compute nodes.

2. The method of claim 1, further comprising, prior to allocating the one or more compute nodes from the pool, evaluating the query to identify two or more conditions of the query referencing data records stored on a first compute node of the first group of compute nodes.

3. The method of claim 2, further comprising, executing one of the two or more conditions on the first compute node, and executing another one of the two or more conditions on one of the compute nodes allocated from the pool.

4. The method of claim 1, wherein the pool includes a maximum number of compute nodes available to be allocated to dynamically replicate portions of the database stored on the first group of compute nodes based on a process ID associated with an application submitting the query for execution.

5. The method of claim 1, wherein the pool includes a maximum number of compute nodes available to be allocated to dynamically replicate portions of the database stored on the first group of compute nodes based on an identity of a user submitting the query for execution.

6. The method of claim 1, wherein the pool includes a maximum number of compute nodes available to be allocated to dynamically replicate portions of the database stored on the first group of compute nodes based on a specified priority assigned to the query.

7. The method of claim 1, further comprising reclaiming the one or more compute nodes allocated from the pool.

8. A computer-readable storage medium containing a program which, when executed, performs an operation for managing database resources on a parallel computer system that includes a database distributed across a first group of compute nodes, wherein each compute node in the first group stores a respective portion of the database, the operation comprising:
  assigning a second group of compute nodes to a pool, wherein each compute node in the pool is available to replicate the respective portion of the database stored on one of the compute nodes in the first group of compute nodes;
  prior to allocating one or more compute nodes from the pool, determining that a predicted decrease in query execution time from replicating respective portions of the database exceeds a specified minimum;
  in response to receiving a query to execute against the database, allocating one or more compute nodes from the pool to dynamically replicate the portion of the database stored on a corresponding one or more compute nodes of the first group of compute nodes; and
  executing, in parallel, the query on at least the one or more compute nodes allocated from the pool and on the corresponding one or more compute nodes of the first group of compute nodes.

9. The computer-readable storage medium of claim 8, wherein the operation further comprises, prior to allocating the one or more compute nodes from the pool, evaluating the query to identify two or more conditions of the query referencing data records stored on a first compute node of the first group of compute nodes.

10. The computer-readable storage medium of claim 9, wherein the operation further comprises, executing one of the two or more conditions on the first compute node, and executing another one of the two or more conditions on one of the compute nodes allocated from the pool.

11. The computer-readable storage medium of claim 8, wherein the pool includes a maximum number of compute nodes available to be allocated to dynamically replicate portions of the database stored on the first group of compute nodes based on a process ID associated with an application submitting the query for execution.

12. The computer-readable storage medium of claim 8, wherein the pool includes a maximum number of compute nodes available to be allocated to dynamically replicate portions of the database stored on the first group of compute nodes based on an identity of a user submitting the query for execution.

13. The computer-readable storage medium of claim 8, wherein the pool includes a maximum number of compute nodes available to be allocated to dynamically replicate portions of the database stored on the first group of compute nodes based on a specified priority assigned to the query.

14. The computer readable storage medium of claim 8, wherein the operation further comprises reclaiming the one or more compute nodes allocated from the pool.

15. A parallel computing system comprising:
  a plurality of compute nodes, each having at least a processor and a memory, the plurality of compute nodes comprising:
    a first group of compute nodes, wherein each compute node in the first group stores a respective portion of an in-memory database; and
    a second group of compute nodes allocated to a pool; wherein each compute node in the pool is available to replicate the respective portion of the database stored on one of the compute nodes in the first group of compute nodes; and
    a master compute node comprising a database management program configured to:
      prior to allocating one or more compute nodes from the pool, determine that a predicted decrease in query execution time from replicating respective portions of the database exceeds a specified minimum,
      in response to receiving a query to execute against the in-memory database, allocate one or more compute nodes from the pool to dynamically replicate the portion of the database stored on a corresponding one or more compute nodes of the first group of compute nodes, and
      execute, in parallel, the query on at least the one or more compute nodes allocated from the pool and on the corresponding one or more compute nodes of the first group of compute nodes.

16. The system of claim 15, wherein the database management program is further configured to, prior to allocating the one or more compute nodes from the pool, evaluate the query to identify two or more conditions of the query referencing data records stored on a first compute node of the first group of compute nodes.

17. The system of claim 16, wherein the first compute node is configured to execute one of the two or more conditions, and one of the compute nodes allocated from the pool is configured to execute another one of the two or more conditions.

18. The system of claim 15, wherein the pool includes a maximum number of compute nodes available to be allocated to dynamically replicate portions of the database stored on the first group of compute nodes based on a process ID associated with an application submitting the query for execution.

19. The system of claim 15, wherein the pool includes a maximum number of compute nodes available to be allocated to dynamically replicate portions of the database stored on the first group of compute nodes based on an identity of a user submitting the query for execution.

20. The system of claim 15, wherein the pool includes a maximum number of compute nodes available to be allocated to dynamically replicate portions of the database stored on the first group of compute nodes based on a specified priority assigned to the query.

21. The system of claim 15, wherein the database management program is further configured to reclaim the one or more compute nodes allocated from the pool.

* * * * *